Nov. 27, 1956    G. H. AKLIN    2,771,817
SEVEN-ELEMENT GAUSS TYPE OBJECTIVE COMPRISING TWO NEGATIVE
MENISCUS COMPONENTS ENCLOSED BY TWO POSITIVE COMPONENTS
Filed March 31, 1955

Fig.1

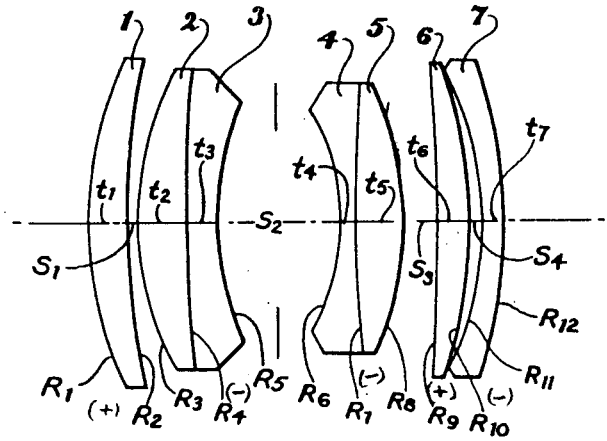

Fig.2

| EF = 100 mm. | | | | f/2.5 |
|---|---|---|---|---|
| Lens | N | V | Radii | Thicknesses |
| 1 | 1.7551 | 47.2 | $R_1$ = +50.30 mm. | $t_1$ = 4.57 mm. |
|   |        |      | $R_2$ = +85.63    | $S_1$ = 0.87 |
| 2 | 1.7340 | 51.0 | $R_3$ = +38.47    | $t_2$ = 6.36 |
| 3 | 1.6170 | 36.6 | $R_4$ = +289.2    | $t_3$ = 3.48 |
|   |        |      | $R_5$ = +26.79    | $S_2$ = 16.30 |
| 4 | 1.6890 | 30.9 | $R_6$ = −28.80    | $t_4$ = 1.98 |
| 5 | 1.7767 | 44.7 | $R_7$ = +365.9    | $t_5$ = 6.01 |
|   |        |      | $R_8$ = −36.00    | $S_3$ = 4.11 |
| 6 | 1.8804 | 41.1 | $R_9$ = −282.9    | $t_6$ = 3.50 |
|   |        |      | $R_{10}$ = −68.09 | $S_4$ = 1.10 |
| 7 | 1.8037 | 41.8 | $R_{11}$ = −47.89 | $t_7$ = 2.33 |
|   |        |      | $R_{12}$ = −60.87 |   |

*George H. Aklin*
INVENTOR.

BY *Daniel I. Mayne*
*Harold F. Bennett*
ATTORNEY & AGENT

United States Patent Office 2,771,817
Patented Nov. 27, 1956

2,771,817

SEVEN-ELEMENT GAUSS TYPE OBJECTIVE COMPRISING TWO NEGATIVE MENISCUS COMPONENTS ENCLOSED BY TWO POSITIVE COMPONENTS

George H. Aklin, Rochester, N. Y., assignor to Eastman Kodak Company, Rochester, N. Y., a corporation of New Jersey Application March 31, 1955, Serial No. 498,148

2 Claims. (Cl. 88—57)

This invention relates to photographic objectives of the so-called Gauss type, also called M-type according to another known system of classification.

This lens type consists of two negative menisci, strongly concave toward each other and axially aligned between two positive components. By strongly concave is meant with a radius of curvature less than 0.5 F. This is a very versatile lens type, being adaptable for use at extremely high aperture covering a moderate field and for covering an extremely wide field at lower relative apertures. The arrangement in which the two negative components are cemented doublets and the positive components are singlets is so widely used as to be considered a norm for this general type, and further advances toward covering a wider field at a given aperture are generally made by adding elements, e. g. by making one or both positive components up as doublets or the negative components as triplets. This is true also in the case of the present invention, in which the rear positive component is a doublet enclosing a small airspace of negative power.

According to the present invention, a photographic objective of the above type is made up in which the rear component consists of a positive element in front of a negative element of lower refractive index and separated therefrom by a small air space having negative power between $-0.15\ P$ and $-0.50\ P$ where P is the power of the whole objective, in which the two positive components are concave toward the negative components, the overall length of the objective is between 0.46 and 0.58 times the equivalent focal length thereof, and the powers of the exterior surfaces of the several components comply with the following algebraic inequalities $$0.4\ P < (P_1 + P_2) < 0.8\ P$$
$$-0.5\ P < (P_3 + P_5) < -0.3\ P$$
$$-0.4\ P < (P_6 + P_8) < -0.1\ P$$
$$0.8\ P < (P_9 + P_{12}) < 1.2\ P$$

where P is the power of the objective as a whole and P with a subscript is the power of the lens surface identified by the subscript, all the lens surfaces being numbered in order from front to rear. Preferably the power of each of the two cemented surfaces is numerically less than 0.1 P.

I have discovered that this small airspace of negative power in the rear component counteracts a tendency to under-corrected spherical aberration in certain lenses of this type, and at the same time has a very beneficial effect on image points off the axis. In my earlier lens shown in Patent No. 2,343,627, March 7, 1944, the rear component consists of a positive element cemented to the front of a negative element of lower refractive index, and the fifth surface, that is the front one of the two inner concave surfaces facing the diaphragm space, is very strongly concave (with a radius about 0.22 F, where F is the focal length) to balance the spherical aberration correction and the flatness of field. This lens had a residual of rim ray aberration at oblique angles, however, which may be characterized as an overcorrected oblique spherical aberration. I have discovered that the rim rays can be improved by making this inner concave surface weaker, and that the resulting under-correction of spherical aberration at the axis is very satisfactorily corrected by bending the negative element of the rear doublet more strongly and thus introducing the aforementioned airspace of negative power. Because of the greater distance from the aperture stop this has a different, and better, influence on the oblique rim rays.

The resulting lens is very highly corrected at an aperture of $f/2.5$ and covers a field of $\pm 28°$, a significantly wider field than my earlier lens.

Preferably the refractive indices N and the radii of curvature R, each numbered by subscripts from front to rear, are within the following limits:

$$1.70 < N_1 < 1.80$$
$$1.68 < N_2 < 1.78$$
$$1.57 < N_3 < 1.67$$
$$1.64 < N_4 < 1.74$$
$$1.73 < N_5 < 1.83$$
$$1.83 < N_6 < 1.93$$
$$1.73 < N_7 < 1.83$$
$$0.46\ F < +R_1 < 0.58\ F$$
$$0.74\ F < +R_2 < 1.10\ F$$
$$0.36\ F < +R_3 < 0.44\ F$$
$$2\ \ \ \ F < +R_4 < 10\ \ \ F$$
$$0.25\ F < +R_5 < 0.30\ F$$
$$0.27\ F < -R_6 < 0.32\ F$$
$$2.5\ \ F < +R_7 < \infty$$
$$0.33\ F < -R_8 < 0.39\ F$$
$$1.6\ \ \ F < -R_9 < 5\ \ \ \ F$$
$$0.52\ F < -R_{10} < 0.75\ F$$
$$0.40\ F < -R_{11} < 0.53\ F$$
$$0.52\ F < -R_{12} < 0.75\ F$$

Also, in order to give good illumination at the edges of the field, it is preferable to keep the overall length of the lens from the front vertex of the front component to the rear vertex of the rear component small, preferably between 0.46 F and 0.58 F. The thickness of each component is then conveniently less than 0.14 F and is understood, of course, to be greater than zero.

In the accompanying drawing:

Fig. 1 shows an objective according to the invention in diagrammatic axial section, and Fig. 2 is a table of constructional data for one specific example.

Fig. 1 will be readily understood, as it shows the objective in conventional manner.

The table of Fig. 2 is repeated as Example 1, below:

*Example 1, Figs. 1 and 2*

[EF=100 mm.   $f/2.5$]

| Lens | N | V | Radii, mm. | Thicknesses, mm. |
|---|---|---|---|---|
| 1 | 1.7551 | 47.2 | $R_1 = +\ 50.30$ | $t_1 = 4.57$ |
|   |        |      | $R_2 = +\ 85.63$ | $s_1 = 0.87$ |
| 2 | 1.7340 | 51.0 | $R_3 = +\ 38.47$ | $t_2 = 6.36$ |
| 3 | 1.6170 | 36.6 | $R_4 = +289.2$   | $t_3 = 3.48$ |
|   |        |      | $R_5 = +\ 26.79$ | $s_2 = 16.30$ |
| 4 | 1.6890 | 30.9 | $R_6 = -\ 28.80$ | $t_4 = 1.98$ |
| 5 | 1.7767 | 44.7 | $R_7 = +365.9$   | $t_5 = 6.01$ |
|   |        |      | $R_8 = -\ 36.00$ | $s_3 = 4.11$ |
| 6 | 1.8804 | 41.1 | $R_9 = -282.9$   | $t_6 = 3.50$ |
|   |        |      | $R_{10} = -\ 68.09$ | $s_4 = 1.10$ |
| 7 | 1.8037 | 41.8 | $R_{11} = -\ 47.89$ | $t_7 = 2.33$ |
|   |        |      | $R_{12} = -\ 60.87$ |   |

A second example is as follows:

*Example 2, Fig. 1*

[EF=100 mm.   f/2.8]

| Lens | N | V | Radii, mm. | Thicknesses, mm. |
|---|---|---|---|---|
| 1 | 1.7551 | 47.2 | $R_1 = + 50.15$ | $t_1 = 4.56$ |
|   |        |      | $R_2 = + 84.17$ | $s_1 = 0.88$ |
| 2 | 1.7340 | 51.0 | $R_3 = + 39.14$ | $t_2 = 6.35$ |
| 3 | 1.6170 | 38.5 | $R_4 = +374.5$  | $t_3 = 3.47$ |
|   |        |      | $R_5 = + 27.46$ | $s_2 = 15.20$ |
| 4 | 1.6890 | 30.9 | $R_6 = - 29.45$ | $t_4 = 2.23$ |
|   |        |      | $R_7 = +578.5$  |  |
| 5 | 1.7767 | 44.7 | $R_8 = - 36.55$ | $t_5 = 5.74$ |
|   |        |      |                 | $s_3 = 4.46$ |
| 6 | 1.8804 | 41.1 | $R_9 = -287.5$  | $t_6 = 3.67$ |
|   |        |      | $R_{10} = - 68.03$ | $s_4 = 1.22$ |
| 7 | 1.7551 | 47.2 | $R_{11} = - 46.27$ | $t_7 = 2.33$ |
|   |        |      | $R_{12} = - 60.18$ |  |

In both these tables, as in Fig. 2, the lens elements are numbered from front to rear in the first column, the refractive indices N for the D line of the spectrum and the conventional dispersive indices V for the several lens elements are given in the second and third columns, and the radii of curvature R of the lens surfaces, the thicknesses $t$ of the lens elements and the spaces $s$ between the lens components, each numbered by subscripts from front to rear, are given in the last two columns. The powers of the individual surfaces are as set forth in the following table:

|  | Ex. 1 | Ex. 2 |
|---|---|---|
| $P_1$ | +1.50 P | +1.51 P |
| $P_2$ | −0.88 P | −0.90 P |
| $P_3$ | +1.91 P | +1.88 P |
| $P_4$ | −0.04 P | −0.03 P |
| $P_5$ | −2.30 P | −2.25 P |
| $P_6$ | −2.39 P | −2.34 P |
| $P_7$ | +0.02 P | +0.02 P |
| $P_8$ | +2.16 P | +2.13 P |
| $P_9$ | −0.33 P | −0.31 P |
| $P_{10}$ | +1.29 P | +1.29 P |
| $P_{11}$ | −1.67 P | −1.63 P |
| $P_{12}$ | +1.32 P | +1.25 P |

It is readily seen from the above tables that both examples embody all the features of the invention, the overall length (computed as the sum of all thicknesses and spaces) is 0.506 F and 0.501 F in the respective examples. The power of the airspace in the rear component is found as $(P_{10}+P_{11})$ and is −0.38 P and −0.34 P in the respective examples. The other aforementioned sums of powers are quickly found in the same way.

The two examples differ but slightly. A lower index was used in the rear (negative) element in the second example to adjust the Petzval sum from +0.146 P to +0.135 P, and some of the radii of curvature were changed accordingly to bring the aberration corrections home again.

It is to be understood that the invention is not limited to the examples given but is of the scope of the appended claims.

I claim:

1. A seven-element photographic objective comprising the following four components: a front singlet, two inner cemented doublets and a rear slightly airspaced doublet, in which the refractive indices N of the lens elements, and the radii of curvature R of the lens surfaces, each numbered by subscript from front to rear are within the following limits:

$1.70 < N_1 < 1.80$
$1.68 < N_2 < 1.78$
$1.57 < N_3 < 1.67$
$1.64 < N_4 < 1.74$
$1.83 < N_6 < 1.83$
$1.73 < N_5 < 1.93$
$1.73 < N_7 < 1.83$
$0.46\ F < +R_1 < 0.58\ F$
$0.74\ F < +R_2 < 1.10\ F$
$0.36\ F < +R_3 < 0.44\ F$
$2\ \ \ \ F < +R_4 < 10\ \ \ F$
$0.25\ F < +R_5 < 0.30\ F$
$0.27\ F < -R_6 < 0.32\ F$
$2.5\ \ F < +R_7 < \infty$
$0.33\ F < -R_8 < 0.39\ F$
$1.6\ \ F < -R_9 < 5\ \ \ \ F$
$0.52\ F < -R_{10} < 0.75\ F$
$0.40\ F < -R_{11} < 0.53\ F$
$0.52\ F < -R_{12} < 0.75\ F$ where F is the focal length of the objective as a whole, and in which the thickness of each component is less than 0.14 F and the over-all length of the objective is between 0.46 F and 0.58 F.

2. A photographic objective substantially according to the specifications set forth in the following table:

| Lens | N | V | Radii | Thicknesses |
|---|---|---|---|---|
| 1 | 1.75 | 47 | $R_1 = +0.50\ F$ | $t_1 = 0.00\ F$ |
|   |      |    | $R_2 = +0.86\ F$ | $s_1 = 0.01\ F$ |
| 2 | 1.73 | 51 | $R_3 = +0.38\ F$ | $t_2 = 0.06\ F$ |
| 3 | 1.62 | 37 | $R_4 = +2.9\ F$  | $t_3 = 0.03\ F$ |
|   |      |    | $R_5 = +0.27\ F$ | $s_2 = 0.16\ F$ |
| 4 | 1.69 | 31 | $R_6 = -0.29\ F$ | $t_4 = 0.02\ F$ |
| 5 | 1.78 | 45 | $R_7 = +3.7\ F$  | $t_5 = 0.06\ F$ |
|   |      |    | $R_8 = -0.36\ F$ | $s_3 = 0.04\ F$ |
| 6 | 1.88 | 41 | $R_9 = -2.8\ F$  | $t_6 = 0.04\ F$ |
|   |      |    | $R_{10} = -0.68\ F$ | $s_4 = 0.01\ F$ |
| 7 | 1.80 | 42 | $R_{11} = -0.48\ F$ | $t_7 = 0.02\ F$ |
|   |      |    | $R_{12} = -0.61\ F$ |  | in which the lens elements are numbered in order from front to rear in the first column, the refractive indices N for the D line of the spectrum and the conventional dispersive indices V are given in the second and third columns, the radii of curvature R of the lens surfaces, the thicknesses $t$ of the lens elements and the spaces $s$ between lens components, each numbered by subscripts from front to rear are given in the last two columns, and in which F is the focal length of the objective as a whole and the + and − signs associated with the radii of curvature denote surfaces respectively convex and concave to the front.

References Cited in the file of this patent

UNITED STATES PATENTS

| 583,336 | Rudolph | May 25, 1897 |
| 1,786,916 | Merte | Dec. 30, 1930 |
| 1,955,591 | Lee | Apr. 17, 1934 |
| 2,194,413 | Warmisham et al. | Mar. 19, 1940 |
| 2,262,998 | Frederick et al. | Nov. 18, 1941 |
| 2,343,627 | Aklin | Mar. 7, 1944 |

FOREIGN PATENTS

| 297,823 | Great Britain | June 27, 1929 |
| 427,008 | Great Britain | Apr. 12, 1935 |